Sept. 23, 1924.  
E. J. FINK  
EYEGLASSES  
Filed Sept. 28, 1922  
1,509,723
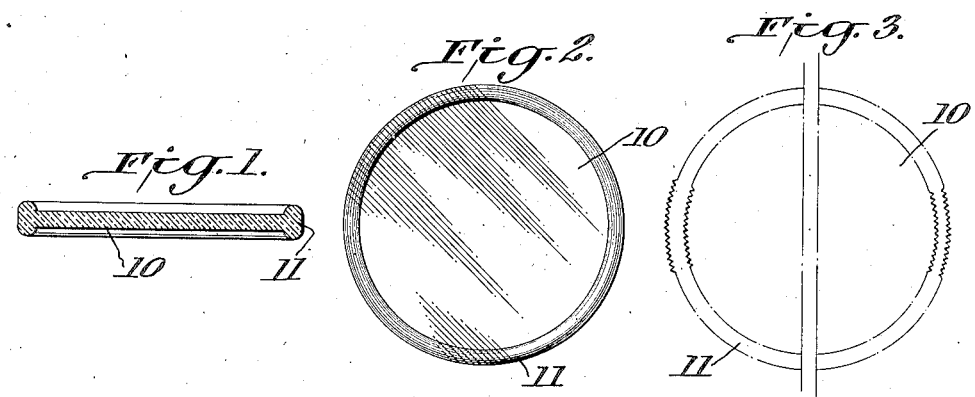
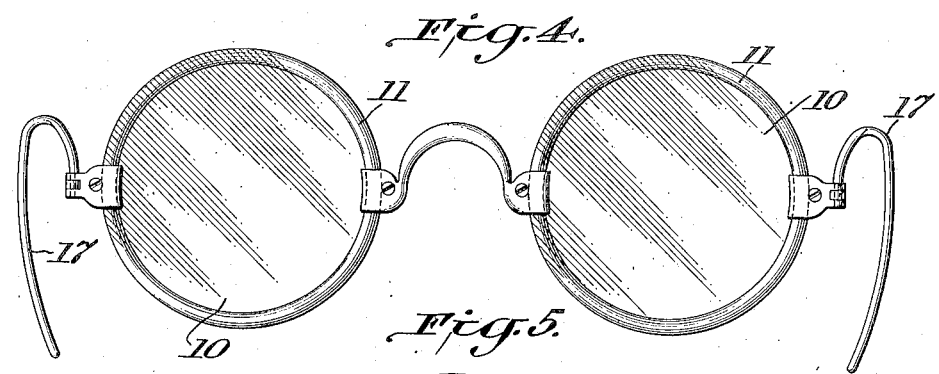
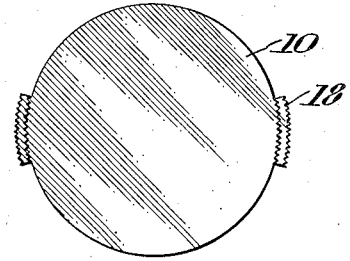
Inventor:  
Edward J. Fink,  
Attorneys.

Patented Sept. 23, 1924.

1,509,723

UNITED STATES PATENT OFFICE.

EDWARD J. FINK, OF NEW YORK, N. Y.

EYEGLASSES.

Application filed September 28, 1922. Serial No. 591,150.

*To all whom it may concern:*

Be it known that I, EDWARD J. FINK, a citizen of United States, residing at 1454 Grand Concourse, New York city, in the county of Bronx and State of New York, have invented certain new and useful Improvements in Eyeglasses, of which the following is a specification.

This invention relates to ophthalmic lenses.

Various efforts have been made to provide lens mounts which do not project into the field of vision and do not necessitate indentation or perforation of the lenses. However all constructions so far evolved as the result of such efforts have serious disadvantages.

Modern science has established the fact that a large percentage of the eyes are subnormal in one respect or another. The curvatures of the lens or of the cornea are often not uniform, causing astigmatism. The axis or axes of the cylinders compensating for the deviations from the normal spherical curvature may lie in any meridian and the lenses must be accurately adjusted relatively to the bridge to assume their proper position.

Some eyes, again, do not show any refractive deficiency, but muscular atony, muscular deformity or muscular derangement, in which case prisms are prescribed. The prism or prismatic component of the lens, also, will have to be accurately placed in order to properly compensate for the deficiency or to have other corrective or curing action, as the case may be.

At present it is fully realized that large glasses with their larger field of view are more desirable than smaller glasses with a correspondingly smaller field of view. The desirability of avoiding encroachment of the usual lens mount upon the field of view is therefore more emphasized than heretofore.

As is well known, the form of eyeglasses and spectacles is not dictated merely by the utilitarian aspect, but largely by the fancies of the individuals.

It is an object of the present invention to provide an eyeglass or spectacle mounting which readily admits the accurate adjustment of the lens relatively to the bridge and does not encroach upon the field of view of the lens.

It is another object to provide a lens which may be mounted upon the lens support in any desired position without the necessity of perforation or indentation thereof.

It is another object to provide a lens of symmetrical and pleasing appearance which may be mounted upon the lens support in any desired position without the necessity of perforation or indentation.

It is still another object to cheaply provide lenses with rims for reinforcing the lens and avoiding scratching of the surfaces thereof.

For a full understanding of the invention, reference is had to accompanying drawings, in which—

Fig. 1 is a sectional view of a lens embodying the invention;

Fig. 2 is an elevation thereof;

Fig. 3 is an elevation of a lens constituting a preferred embodiment of the invention;

Fig. 4 is an elevation of a pair of spectacles constructed according to the invention;

Fig. 5 is an elevation showing a modification; and

Fig. 6 is an edge view showing diagrammatically how a rim may be formed on a lens.

In the drawings 10 represents a lens and 11 a rim formed integrally therewith and projecting laterally beyond the edge portions thereof i. e. generally at an angle and, in particular, at right angle to the lens faces.

I prefer to take a lens ground and polished on both sides i. e. ready to perform its optical function, and form the rim thereon by heating the edge and shaping the heated portion. This may be readily accomplished by placing the lens between two protecting disks which cover all the lens except so much of the margin as is intended to be heated. The exposed part is then heated until the glass becomes sufficiently plastic for shaping it. By means of a suitable tool the glass may then be forced against the edges of the protecting disks to give it the desired shape. It is understood that the edges of the disks and the tool define the mold for imparting the required shape.

The tool may define a groove of semi-circular, V-shaped, oval, or other desired cross-sectional configuration. It is obvious that there is considerable latitude as to the operation of shaping the plastic material. As diagrammatically indicated in Fig. 6, the tool may be a wheel 12 the periphery of which has a groove 13 and the protecting disks may have complementary grooves 14 and 15 respectively to co-operate with the groove of the wheel to produce the cross-sectional configuration shown in Fig. 1. The wheel 12, when run over the margin 16, causes the soft or plastic material to assume the shape defined by the co-operation of the grooves 14, 15 and 13.

While I have referred to one particular mode of shaping the rim, for the purpose of illustration, experts in the art will be able to devise other methods of accomplishing the object.

As indicated in Fig. 3 the inner or outer surface or both, of the rim may be provided with serrations for affording a secure connection for the lens mount and at the same time make a fine angular adjustment possible between the lens and the bridge to satisfy the conditions of a prescription in regard to the position of the axis of a cylinder or the medial line of a prism. In fact the serrations or other forms of indentations may be located in any plane parallel to the plane of the lens so that the lens mount may be secured in a plurality of angular positions. The serrations may be made sufficiently small to be inconspicuous.

As an alternative the serrations may be made to extend only over a comparatively small angle, as indicated in Fig. 5. In the majority of the cases, the axis of the correcting cylinder lies either in or near the horizontal or in or near the vertical and only a relatively fine adjustment in this respect is necessary.

The rim may be left plain, as shown in Fig. 1, and at the time the lens is to be incorporated in a pair of eyeglasses or spectacles, the rim may be locally heated and one or more serrations or other anchoring depressions formed in the rim at the proper angular location.

At any rate, the formation of the rim makes it possible to place the lens in any desired angular position relatively to the bridge or lens mount without necessitating perforation, indentation or other mutilation of the lens proper. The field of vision is thus entirely unobstructed and weakening of the lens is avoided.

A construction of the character described has all the advantages of a lens contained in a separate rim frame without its disadvantages and is cheaper. While in horn, shell or like constructions of artificial preparations the lens may become loose in the frame and turn, or even drop out, a lens made according to the invention will remain in the assigned position.

Another advantage of the proposed construction is that the clear field of vision may be a maximum for a given interpupillary distance or a given distance between the centers of the lenses.

While in the preferred embodiment of the invention the rim extends all around the lens, certain material advantages of the inventions are obtained when only a relatively small angular portion 18 of the lens is provided with a circular rim section, as shown in Fig. 5. In many cases a limited angular range of adjustment is sufficient. The lens itself may be oval or circular.

Lenses according to the invention also prevent scratching of the lens surfaces and have in this respect the advantage of the glasses encased in heavy-rim frames of the type now in common use. The rim is moreover a mechanical reinforcement of the lens eliminating in a large measure the danger of breaking. This advantage is, of course, not limited to eyeglasses and spectacles, but applies equally to reading glasses or the like.

As indicated in Fig. 4, the attachment of the temples 17 may be made at any desired point of the periphery of the lens. This merely emphasizes the great advantage obtained. The lenses may be manufactured in stock quantities like ordinary lenses and yet may be applied in any desired angular position without a holding frame and without curtailing the field of vision or without perforation or indentation of any kind.

In the claims the term "ophthalmic lens" is intended to include reading glasses.

I claim:—

1. An ophthalmic lens containing as an integral part thereof a rim projecting laterally beyond the edge portion of the lens.

2. In eyeglasses and spectacles, a lens containing as an integral part thereof a rim projecting laterally beyond the edge portion of the lens.

3. In eyeglasses and spectacles, a lens containing as an integral part a rim portion adjoining the edge and projecting laterally beyond the edge of the lens, and a lens mount constructed and arranged to be secured in any of a plurality of positions along said portion.

4. In eyeglasses and spectacles, a lens containing as an integral part a portion extending along the edge thereof and defining shoulders projecting laterally of the edge of the lens and substantially in alignment therewith.

5. In eyeglasses and spectacles, a lens containing as an integral part a portion extending along the edge thereof and defining shoulders projecting laterally of the edge of the lens and substantially in alignment therewith, the said portion including a plurality of indentations uniformly spaced in a plane parallel to the plane of the lens, whereby a lens mount may be securely fastened to the said portion in any of a plurality of angular positions relatively to the lens.

6. In eyeglasses and spectacles, a lens containing as an integral part a portion extending along the edge thereof and defining a shoulder projecting laterally of the edge and substantially in alignment therewith, the face of the shoulder being serrated.

7. In eyeglasses and spectacles, a lens containing as an integral part a substantially circular portion outwardly of the edge thereof defining a substantially circular shoulder substantially in alignment with the edge.

8. In eyeglasses and spectacles, a lens containing as an integral part a substantially circular portion outwardly of the edge thereof defining a substantially circular shoulder substantially in alignment with the edge, the said portion including indentations spaced in a plane parallel to the plane of the lens.

9. In eyeglasses and spectacles, a lens containing as an integral part but outwardly of the field of view thereof a portion the curvature of which conforms to the edge of the lens, the said portion containing indentations lying in a curved line conforming to the edge of the lens, and a lens mount adjustable along said portion and having means engaging one of said indentations according to the relative position of the lens mount and the said portion.

10. In eyeglasses and spectacles, a lens containing as an integral part a rim projecting laterally of the edge of the lens in conformity therewith outwardly of the field of view and containing indentations spaced in a plane parallel to the plane of the lens.

11. In eyeglasses and spectacles, a lens containing as an intergral part a rim defining shoulders extending substantially at right angle to the body of the lens, the faces of the shoulders being serrated.

12. In eyeglasses and spectacles, a substantially circular lens having as an integral part outside the field of view thereof a substantially circular rim portion, a lens mount, the lens mount and the said portion being constructed and arranged to permit an adjustment of the former along the latter.

13. In eyeglasses and spectacles, a substantially circular lens having as an integral part outside the field of view thereof a substantially circular rim portion projecting laterally of the edge of the lens.

14. In eyeglasses and spectacles, a substantially circular lens having as an integral part outside the field of view thereof a substantially circular rim portion projecting laterally of the edge of the lens and having indentations in a plane parallel to the edge of the lens.

In testimony whereof, I affix my signature.

EDWARD J. FINK.